(12) United States Patent
Dussillols et al.

(10) Patent No.: US 10,227,420 B2
(45) Date of Patent: Mar. 12, 2019

(54) ELIMINATION OF CONTAMINANTS IN WET NATURAL RUBBER

(71) Applicant: COMPAGNIE GENERALE DES ETABLISSEMENTS MICHELIN, Clermont-Ferrand (FR)

(72) Inventors: Jérôme Dussillols, Clermont Ferrand (FR); Jean-Luc Merceron, Mozac (FR)

(73) Assignee: COMPAGNIE GENERALE DES ESTABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 15/564,322

(22) PCT Filed: Apr. 8, 2016

(86) PCT No.: PCT/FR2016/050811
§ 371 (c)(1),
(2) Date: Oct. 4, 2017

(87) PCT Pub. No.: WO2016/162645
PCT Pub. Date: Oct. 13, 2016

(65) Prior Publication Data
US 2018/0134814 A1    May 17, 2018

(30) Foreign Application Priority Data

Apr. 10, 2015  (FR) .................................... 15 53154

(51) Int. Cl.
| | | |
|---|---|---|
| *C08G 63/02* | (2006.01) | |
| *C08C 3/02* | (2006.01) | |
| *B29C 47/00* | (2006.01) | |
| *B29C 47/08* | (2006.01) | |
| *B29C 47/36* | (2006.01) | |
| *B29C 47/66* | (2006.01) | |
| *B29C 47/68* | (2006.01) | |
| *B29C 47/38* | (2006.01) | |
| *C08C 1/14* | (2006.01) | |
| *B29K 7/00* | (2006.01) | |

(52) U.S. Cl.
CPC ............ *C08C 3/02* (2013.01); *B29C 47/0004* (2013.01); *B29C 47/0813* (2013.01); *B29C 47/0844* (2013.01); *B29C 47/0847* (2013.01); *B29C 47/367* (2013.01); *B29C 47/385* (2013.01); *B29C 47/666* (2013.01); *B29C 47/68* (2013.01); *C08C 1/14* (2013.01); *B29C 47/0881* (2013.01); *B29K 2007/00* (2013.01)

(58) Field of Classification Search
USPC ......................................... 528/500, 501, 502
See application file for complete search history.

(56) References Cited

U.S. PATENT DOCUMENTS 5,156,781 A    10/1992  Böhm et al.

FOREIGN PATENT DOCUMENTS

| DE | 102013106337 A1 | 12/2014 |
|---|---|---|
| EP | 0492425 A1 | 7/1992 |
| EP | 0613924 A1 | 9/1994 |
| FR | 2320135 A1 | 3/1977 |
| GB | 1545243 A | 5/1979 |
| JP | 2004195675 A | 7/2004 |
| WO | 9956938 A1 | 11/1999 |

OTHER PUBLICATIONS

US 5,206,560, 03/2001, Meyer et al. (withdrawn)
French Search Report dated Mar. 1, 2016.
International Search Report dated Oct. 7, 2016.
International Search Report for PCT/FR2016/050811 dated Jul. 10, 2016.

*Primary Examiner* — Terressa Boykin
(74) *Attorney, Agent, or Firm* — Dickinson Wright PLLC

(57) ABSTRACT

A method for preparation of decontaminated natural rubber is provided. The method is characterized in that it comprises a decontamination step in which wet natural rubber coagulum passes through a system comprising an extruder and a filter installed at the extruder outlet, the extruder comprising an axially symmetrical grooved sheath comprising in its thickness grooves opening on the inner surface of the sheath.

19 Claims, 2 Drawing Sheets

ELIMINATION OF CONTAMINANTS IN WET NATURAL RUBBER

This application is a 371 national phase entry of PCT/FR 2016/050811, filed on 8 Apr. 2016, which claims benefit of French Patent Application No. 1553154, filed 10 Apr. 2015, now French patent No. 3034703 (B1), the entire contents of which are incorporated herein by reference for all purposes.

BACKGROUND

Field of the Invention

The invention concerns a method for decontamination of natural rubber, allowing elimination of contaminants which may be present in natural rubber. The contaminants are for example vegetables, plastics, mineral granulates and textiles.

Related Art

Natural polyisoprene, also called natural rubber, is obtained from hevea sap, in particular from hevea *Brasiliensis*. The harvested product must be cleaned, homogenised, coagulated and dried. Coagulation may take place by so-called natural coagulation or artificial coagulation, for example chemically by the addition of acid or salts. Coagulation may occur before the steps of cleaning and homogenisation, or afterwards. The method for processing natural rubber conventionally comprises steps of elimination of contaminants:

primary decontamination intended to eliminate coarse objects, primarily by washing and crushing for coagulated natural rubber or by filtration for uncoagulated natural rubber;

secondary decontamination intended to eliminate finer objects, traditionally performed by passage through creping machines.

Creping machines are machines with two rotating grooved cylinders between which the rubber passes. This operation may be repeated several times until a sheet is obtained known as "crepe". Finally, the dry and decontaminated natural rubber is usually provided in the form of cakes or bales.

When the rubber is intended for tire preparation, it is essential that it contains as few contaminants as possible. In general, dry natural rubbers are therefore filtered before use in a rubber compound for tires.

An object of the invention is to use a suitable filtration system allowing decontamination of wet natural rubber. This system may in particular replace completely the creping machines conventionally used, thus allowing better control of the process, obtaining a natural rubber free from contaminants of a size larger than that of the filter mesh, and a gain in the volume occupied.

The filtration of the dry natural rubber treated with a stabiliser is described in patent EP 0 613 924. This patent describes in particular the stabilisation of dry natural rubber with the stabiliser in a heated extruder, with filtration at the extruder outlet by means of a filter. The inventors have found that smooth sheath extruders, as described in this application, cannot be used for natural rubber with a humidity level greater than 12%: the natural rubber slides on the wall of the extruder and cannot advance through the extruder to allow passage of this natural rubber through the filter.

Patent FR 2 320 135 concerns the use of wet natural rubber in an extruder for homogenising the natural rubber, instead of creping machines. This patent claims an extruder with a screw with conical hub, with a progressive pitch and interrupted threads. The wet natural rubber emerges through orifices positioned on the sheaths at the end of the machine. The wet natural rubber does not emerge through a die plate at the end of the screw, as with a conventional extruder. The sheath is equipped with holes allowing evacuation of serum from the extruder. This system cannot be adapted for filtration. Furthermore, the evacuation of serum through holes in the extruder sheath necessitates considerable cleaning and maintenance.

Examples of extruders which may be used in the field of rubber compounds are described in applications EP 492 425, WO99/56938, DE 10 2013 106337.

Application JP 2004/195675 describes an extruder comprising a grooved sheath allowing limitation of heating of the melted plastic. The grooves may have variable forms and dimensions.

SUMMARY

An object of the invention is a filtration system for wet natural rubber for eliminating contaminants.

Natural rubber is obtained from hevea sap, in particular from hevea *Brasiliensis*. The contaminants are for example tree bark, branches and twigs, leaves and stems. These contaminants may also be mineral granulates or plastic or textile fibres.

The filtration system gives a wet natural rubber free from contaminants of size larger than the mesh of the filter used. The use of wet natural rubber allows lower energy consumption for eliminating contaminants than filtration of dry natural rubber. This filtration system includes filtering the wet natural rubber at the outlet from an extruder, the sheath of which is equipped with grooves allowing the natural rubber to advance in the extruder.

In a preferred variant, a gear pump is installed between the extrusion screw and the filter.

The grooves define the ribs, the upper faces (11) of which delimited by two intersection ridges (111, 112) constitute the inner surface of the sheath.

Figure 1:
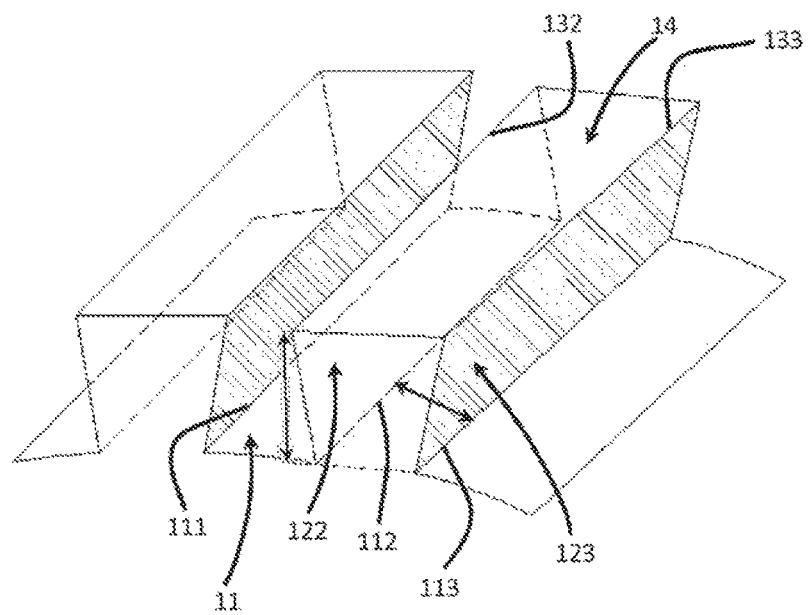
FIG. 1 shows diagrammatically in three dimensions two consecutive grooves separated by a rib. The groove comprises a bottom face (14) delimited by two bottom ridges (132, 133), two side faces (122, 123) extending towards the inside from the bottom face (14), each being delimited by a bottom ridge (132, 133) and a ridge (112, 113) intersecting the inner surface of the sheath.

On FIG. 1, the distance between two consecutive ribs is the distance between two intersection ridges (112 and 113) represented by the double arrow. The distance between two grooves is the distance between the two intersection ridges (111 and 112).

On FIG. 1, the minimum distance separating the bottom face (14) and the plane passing through the intersection ridges (112 and 113) is represented by the highlighted double arrow.

Figure 2:
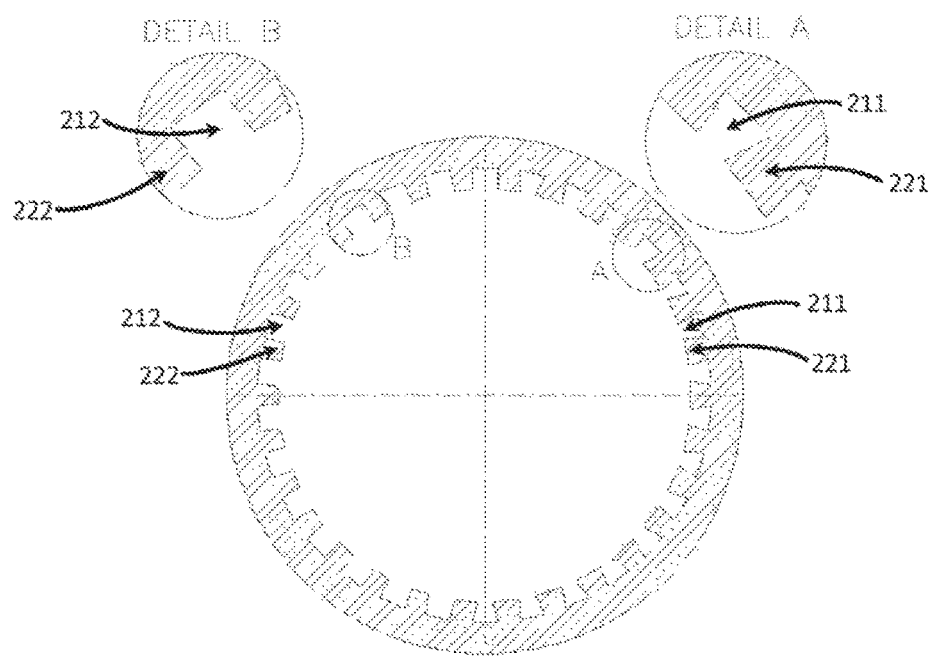

FIG. 2 shows a cross-section of the grooved sheath.

In the right-hand part of the semicircle (marked A on the figure), the grooves (211) have a dovetail shape. In the left-hand part of the semicircle (marked B on the figure), the grooves (212) have a notched shape.

The grooves (211, 212) define ribs (221, 222).

FIG. 3 shows the system used.

Figure 3A:
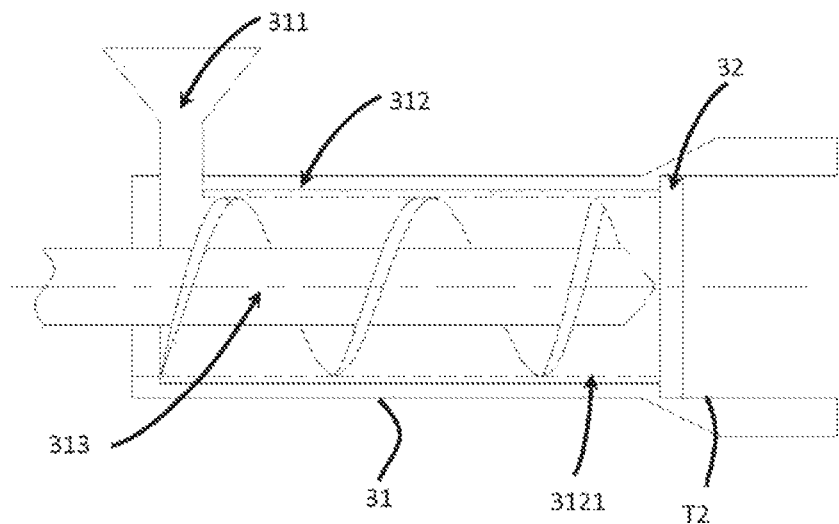

On FIG. 3A, the system comprises an extruder (31) and a filter carrier (32) (filter not shown on the figure). On FIG. 3B, the system also comprises a gear pump (33).

The extruder (31) comprises a supply hopper (311), a sheath (312) with grooves (3121) and a single screw (313) comprising a hub and a thread which extends radially outwardly relative to the hub.

At the outlet from the extruder, the system comprises one or more filter(s) installed on a filter carrier (32).

Figure 3B:
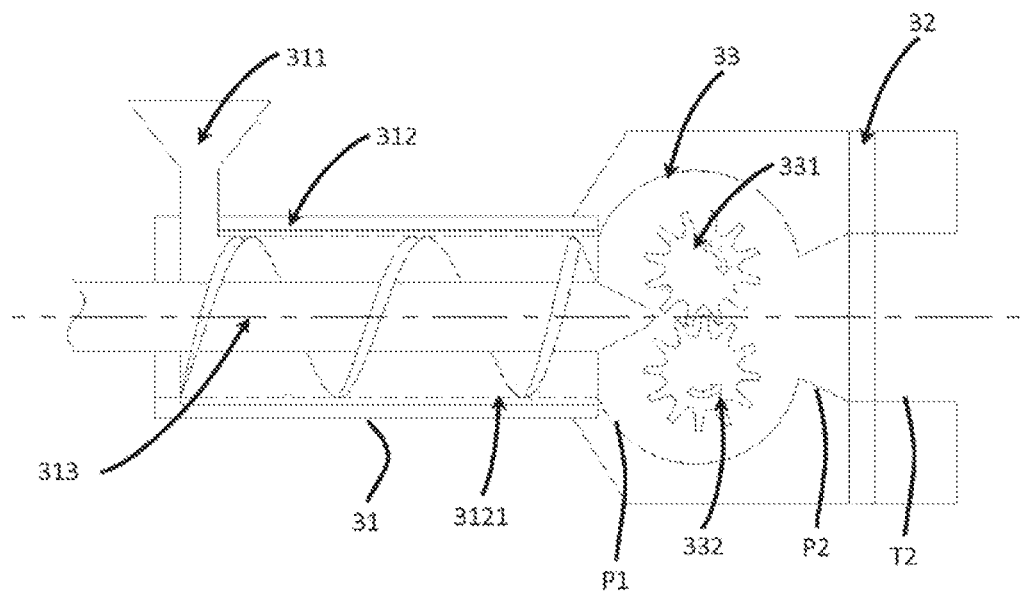

In the preferred variant shown on FIG. 3B, the system also comprises an external gear pump (33).

The system may also comprise measuring means, in particular for measuring pressures (P1, P2) and temperatures (T2).

DETAILED DESCRIPTION OF EXAMPLE EMBODIMENTS

An object of the invention is therefore a method for preparation of decontaminated natural rubber, characterized in that it comprises a decontamination step in which wet natural rubber coagulum with a humidity level greater than 12% by weight passes through a system comprising an extruder and a filter installed at the extruder outlet, the extruder comprising a grooved sheath, a screw arranged in the sheath and comprising a hub and a thread which extends radially outwardly relative to the hub,
a grooved sheath having an axially symmetrical structure comprising in its thickness grooves opening on the inner surface of the sheath,
each groove comprising
  a bottom face delimited by two bottom ridges,
  two side faces extending towards the inside from the bottom face, each being delimited by a bottom ridge and a ridge intersecting the inner surface of the sheath,
and characterized in that the sheath is such that, in any plane perpendicular to the axis of the sheath, R expressed in mm being the distance between the sheath centre and the inner surface of the sheath:
  a. the ratio (total length of groove openings expressed in mm)/($2\pi R$), designated A, is at least equal to 0.25 and at most equal to 0.9;
  b. the ratio (number of grooves/2R), designated B, is greater than or equal to 0.1;
  c. the ratio (depth of grooves expressed in mm)/(2R), designated C, is greater than 0.02, and
  d. the plane passing through the two bottom ridges forming, with each plane passing through a bottom ridge and an intersection ridge delimiting a side face, an angle d at least equal to 60° and at most equal to 90°.

In the sense of embodiments of the present invention, the grooves define ribs, the upper faces of which delimited by two intersection ridges constitute the inner surface of the sheath.

In the sense of embodiments of the present invention, "intersection ridge" or the "ridge intersecting the inner surface of the sheath" (111, 112, 113) is the ridge between the side face and the inner surface of the sheath.

In the sense of embodiments of the present invention, the "total length of the groove openings" is the sum of the distances in millimetres between the two intersection ridges between two ribs.

In the sense of embodiments of the present invention, the "groove depth" is defined by the minimum distance in millimetres separating the bottom face and the plane passing through the intersection ridges.

In the sense of embodiments of the present invention, the "minimum distance" is the minimum radial distance relative to the axis of the sheath.

Coagulum:

The extruder is supplied with a coagulum of natural rubber.

The term "coagulum of natural rubber" means, in the sense of embodiments of the present invention, a natural rubber which is coagulated naturally or artificially.

This coagulum may be obtained by coagulation of liquid latex which has been cleaned and homogenised.

It may also be obtained by natural coagulation ("cup bottom" coagulum) or by artificial coagulation. The coagulum may then be cleaned and homogenised before introduction into the extruder.

In all cases, the initial form of the coagulum (sheet, granulate, crepes etc.) is not important. This natural rubber coagulum is wet. Its humidity level is advantageously greater than 12%, more advantageously varying between 12% and 40%. The percentages are expressed in weight in relation to the total weight of the coagulum.

Sheath and Extrusion Screw:

The extruder comprises a grooved sheath and a screw arranged in the sheath. This screw comprises a hub and a thread which extends radially outwardly relative to the hub. The diameter of the hub is advantageously constant.

The screw may comprise one or more threads, in particular one or two threads. The thread advantageously has a regular pitch. The extruder is advantageously a single screw extruder.

The extrusion screw allows the pressure of the wet natural rubber to be increased.

The sheath may be cylindrical or conical in form. The grooved sheath is advantageously a cylindrical structure.

The sheath has an opening connected to a supply hopper allowing introduction of the wet coagulum. The extrusion screw allows the rubber to be transported from the inlet opening towards the end of the sheath opening onto the filter.

According to any embodiment of the invention, the sheath preferably comprises, in the supply zone, one or more openings intended to evacuate from the sheath water which may be expelled by the coagulum during the increase in pressure in the sheath. The supply zone is the zone which is located below the opening of the hopper. The openings intended to evacuate the water may take the form of a slot or circular hole.

The sheath is advantageously such that A is at least equal to 0.3 and most equal to 0.7. More particularly, A is at least equal to 0.45 and at most equal to 0.55.

In any plane perpendicular to the cylinder axis, the distance between the two intersection ridges between two ribs is advantageously 8 to 15 mm for an internal sheath diameter 2R of 60 to 230 mm.

In any plane perpendicular to the cylinder axis, the depth of the grooves is advantageously 2 to 10 mm for an internal sheath diameter 2R of 60 to 230 mm.

The grooves may take the form of notches or dovetails. Each groove is advantageously trapezoid in form, the large base of the trapezium forming the bottom of the groove, the sides of the trapezium adjacent to the large base forming the side walls of the groove, the height of the trapezium being the depth of the groove.

In particular, the bottom of the grooves is an arc of circle $C_R$ and the ratio C is calculated by the formula (I)

$$\frac{D_{extF} - D_{intF}}{D_{intF}} > 0.02 \quad (I)$$

$D_{intF}$ being the diameter of the inner surface of the sheath, or 2R $D_{extR}$ being the diameter of circle $C_R$, the centre of which is the hub axis.

The grooves of the sheath are advantageously parallel to the sheath axis.

The grooves of the sheath are advantageously helical.

Filter:

The system comprises, at the extruder outlet, one or more filter(s) advantageously carried by a filter carrier (32) and allowing retention of contaminants.

In the sense of embodiments of the present invention, "the extruder outlet" designates the outlet from the extrusion screw.

The filter is any suitable filtration means. The filter advantageously allows filtration of contaminants of size greater than 1 mm, advantageously greater than 500 μm, more advantageously greater than 100 μm.

In particular, it may be one or more mesh filters, the size of which is selected as a function of the filtration mesh, installed on a filter carrier. The mesh size advantageously varies from 100 μm to 1 mm. In some cases, several filters may be arranged in succession.

The filters can then easily be changed during the process using a suitable system, continuously or discontinuously.

Gear Pump

In a preferred variant, the system also comprises a gear pump (33) at the extruder outlet, before the filter.

Advantageously, a single gear pump (33) is used comprising two gear wheels (331, 332) arranged side by side and intermeshing (therefore turning in opposite directions). When the filtration pressure increases in an extruder, the flow rate to be filtered reduces considerably. When a gear pump is used, the flow rate to be filtered depends on the capacity and speed of the gear pump and is therefore much less dependent on the pressure. The gear pump therefore allows better stability of flow rate as a function of filtration pressure of the gear pump, and thus for the same filter dimensions, use of the gear pump increases the filtration rate independently of the filtration pressure.

In other words, the gear pump allows a reduction in the system dimensions in order to filter the same flow rate.

The gear pump is dimensioned for pumping wet natural rubber and for increasing the pressure of the natural rubber to be filtered through the filter.

The global extrusion flow advantageously varies from 100 kg/h to 5 t/h.

The supply hopper is advantageously in direct contact with the external atmosphere, and hence the coagulum is supplied at ambient temperature and pressure.

The pressure at the extruder head advantageously varies from 10 to 100 bar.

At the outlet from the system, the temperature (T2) of the decontaminated rubber advantageously varies from 80 to 95° C.

In some cases, the extruder may comprise heating or cooling means.

At the system outlet, i.e. after the filter, any system giving the desired form may be provided.

The invention also concerns a method for processing natural rubber, characterized in that it comprises the following successive steps:

a. Cleaning, homogenisation and coagulation of natural rubber;
b. Decontamination using the method according to embodiments of the invention;
c. Drying of the decontaminated natural rubber.

The coagulation may be natural or artificial.

The natural rubber may be treated in either its liquid or solid form. In the first case, the liquid natural rubber (known as latex) is cleaned, homogenised and then coagulated. In the second case, the latex is coagulated and the coagulum is cleaned and homogenised.

The decontaminated natural rubber is advantageously dried to a humidity level of less than 0.8%. The method may also comprise steps of crushing.

The invention also concerns a system comprising an extruder, a filter and in some cases a gear pump as described above.

The invention claimed is:

1. A method for preparation of decontaminated natural rubber, characterized in that it comprises a decontamination step in which wet natural rubber coagulum with a humidity level greater than 12% by weight passes through a system comprising an extruder and a filter installed at the extruder outlet, the extruder comprising a grooved sheath, a screw arranged in the sheath and comprising a hub and a thread which extends radially outwardly relative to the hub, a grooved sheath having an axially symmetrical structure comprising in its thickness grooves opening on the inner surface of the sheath, each groove comprising
  a bottom face delimited by two bottom ridges,
  two side faces extending towards the inside from the bottom face, each being delimited by a bottom ridge and a ridge intersecting the inner surface of the sheath, and characterized in that the sheath is such that, in any plane perpendicular to the axis of the sheath, R expressed in mm being the distance between the sheath center and the inner surface of the sheath:
  a. the ratio (total length of groove openings expressed in mm)/($2\pi R$), designated A, is at least equal to 0.25 and at most equal to 0.9;
  b. the ratio (number of grooves/2R), designated B, is greater than or equal to 0.1;
  c. the ratio (depth of grooves expressed in mm)/(2R), designated C, is greater than 0.02, and
  d. the plane passing through the two bottom ridges forming, with each plane passing through a bottom ridge and an intersection ridge delimiting a side face, an angle d at least equal to 60° and at most equal to 90°.

2. A method according to claim 1, characterized in that the grooved sheath is a cylindrical structure.

3. A method according to claim 1, characterized in that A is at least equal to 0.3 and at most equal to 0.7.

4. A method according to claim 1, characterized in that A is at least equal to 0.45 and at most equal to 0.55.

5. A method according to claim 1, characterized in that each groove is trapezoid in form, the large base of the trapezium forming the bottom of the groove, the sides of the trapezium adjacent to the large base forming the side walls of the groove, the height of the trapezium being the depth of the groove.

6. A method according to claim 1, characterized in that the bottom of the grooves is an arc of circle $C_R$ and the ratio C is calculated by the formula (I)

$$\frac{D_{extF} - D_{intF}}{D_{intF}} > 0.02 \qquad (I)$$

$D_{intF}$ being the diameter of the inner surface of the sheath, or 2R $D_{extR}$ being the diameter of circle $C_R$, the center of which is the hub axis.

7. A method according to claim 1, characterized in that the grooves of the sheath are parallel to the axis of the sheath.

8. A method according to claim 1, characterized in that the grooves of the sheath are helical.

9. A method according to claim 1, characterized in that the filter allows filtration of contaminants of size greater than 1 mm.

10. A method according to claim 1, characterized in that the filter is a filter carrier comprising one or more mesh filters.

11. A method according to claim 1, characterized in that the system also comprises a gear pump at the extruder outlet before the filter.

12. A method according to claim 1, characterized in that the hub diameter is constant.

13. A method according to claim 1, characterized in that the extruder is a single screw extruder.

14. A method according to claim 1, characterized in that the extruder is supplied with a wet natural rubber coagulum with a humidity rate varying from 12% to 40%.

15. A method for processing of natural rubber, characterised in that it comprises the following successive steps:
   a. Cleaning, homogenisation and coagulation of natural rubber;
   b. Decontamination by the method defined in claim 1;
   c. Drying of the decontaminated natural rubber.

16. A system comprising a grooved sheath extruder, a filter and in some cases a gear pump, characterized in that the extruder, the filter and the gear pump are as defined in claim 1.

17. A method according to claim 1, characterized in that the filter allows filtration of contaminants of size greater than 500 µm.

18. A method according to claim 1, characterized in that the filter allows filtration of contaminants of size greater than 100 µm.

19. A method according to claim 1, characterized in that the extruder is a single screw extruder with a thread of regular pitch.

* * * * *